No. 804,096. PATENTED NOV. 7, 1905.
M. BROWN, Jr.
DITCHING MACHINE.
APPLICATION FILED JULY 24, 1905.
2 SHEETS—SHEET 2.
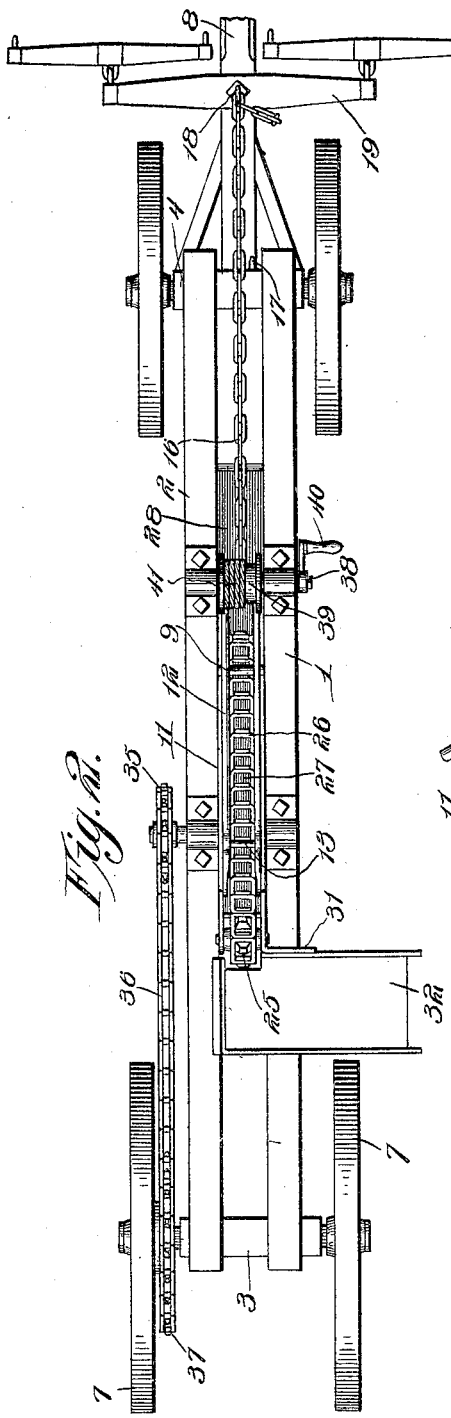
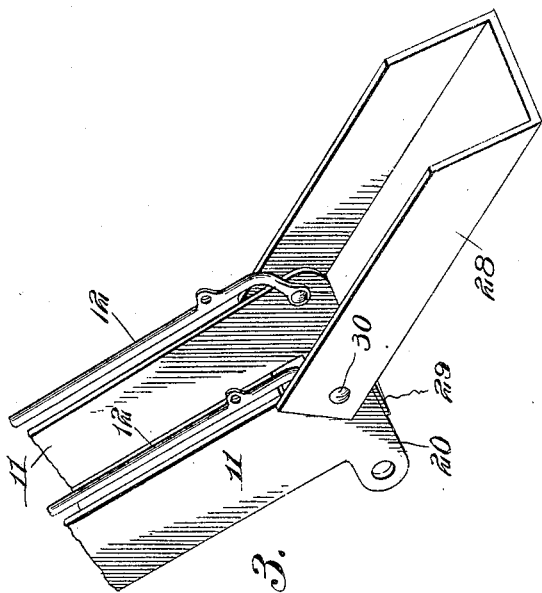
Witnesses
Louis D. Heinrichs
Herbert D. Lawson
Inventor
Mathias Brown, Jr.
By W. J. FitzGerald & Co.,
Attorneys

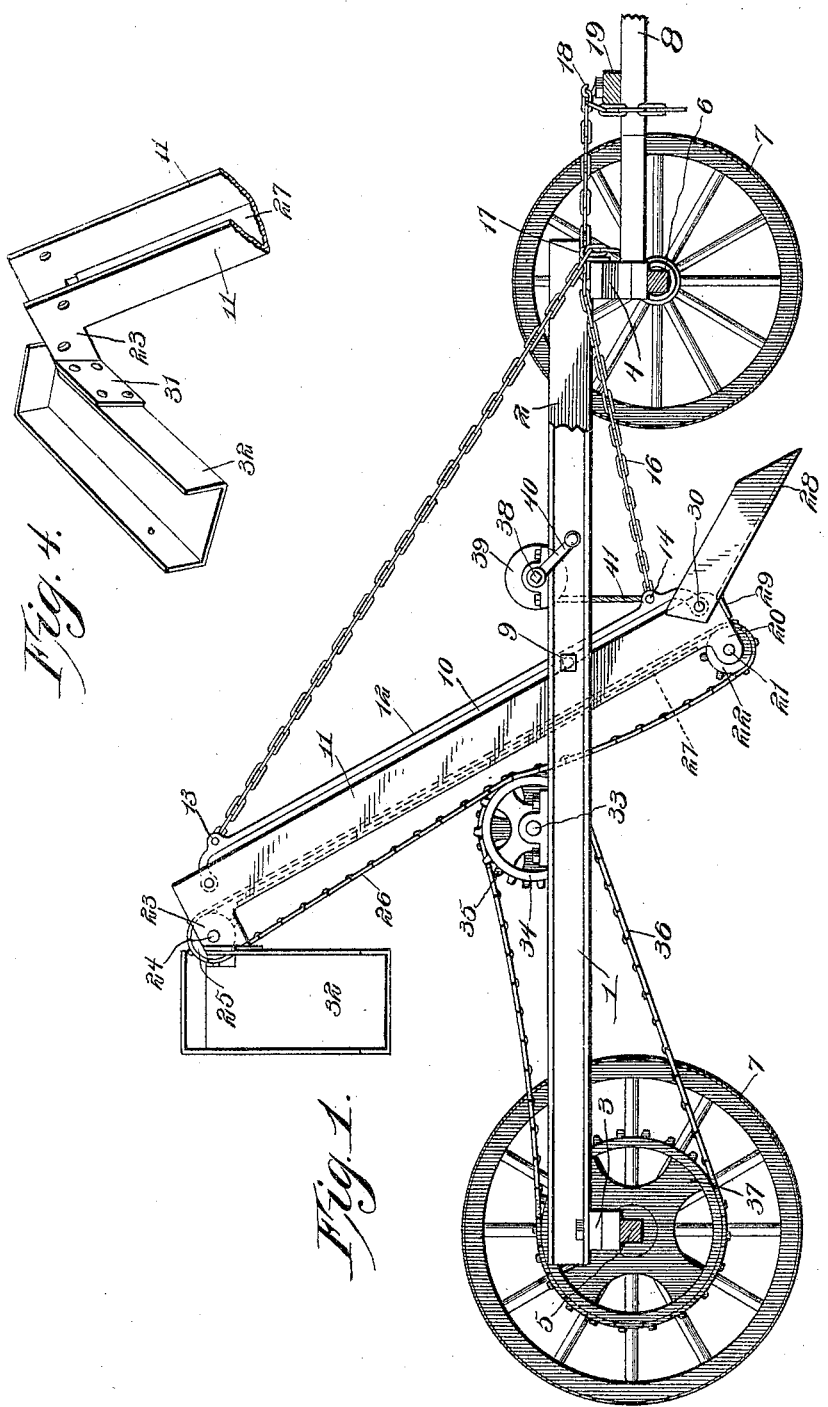

UNITED STATES PATENT OFFICE.

MATHIAS BROWN, JR., OF BATTLECREEK, IOWA.

DITCHING-MACHINE.

No. 804,096.      Specification of Letters Patent.      Patented Nov. 7, 1905.

Application filed July 24, 1905. Serial No. 271,054.

*To all whom it may concern:*

Be it known that I, MATHIAS BROWN, Jr., a citizen of the United States, residing at Battlecreek, in the county of Ida and State of Iowa, have invented certain new and useful Improvements in Ditching-Machines; and I do hereby declare the following to be a full, clear, and exact description of the invention, such as will enable others skilled in the art to which it appertains to make and use the same.

My invention relates to ditching-machines; and its object is to provide a simple durable machine of this character which is operated by the forward movement of the machine for removing dirt from the line of travel of the device.

Another object is to provide simple means for transmitting motion from one of the wheels of the machine to the conveyer employed for hoisting dirt from the shovel to the discharge-spout.

A still further object is to provide a conveyer and shovel which can be adjusted to any desired height from or angle to the ground.

With the above and other objects in view the invention consists of a frame mounted upon suitable axles, which are supported by wheels of ordinary construction, and one of the wheels has a sprocket rotatable therewith for transmitting motion through a chain to one of a pair of sprockets mounted upon a shaft journaled upon the frame. The other sprocket meshes with the lower portion of an endless conveyer-chain, and this conveyer-chain travels within a conveyer-frame, which is adjustably mounted within the frame of the machine. A shovel is located at the lower end of the conveyer-frame, and a discharge-spout extends from the other end thereof. Means are employed for adjusting the conveyer and its frame vertically and also for swinging and holding it at a desired angle to the ground.

The invention also consists of the further novel features of construction and combination of parts hereinafter more clearly set forth, and pointed out in the claims.

In the accompanying drawings I have shown the preferred form of my invention.

In said drawings, Figure 1 is a side elevation of the complete machine, one of the side rails of the main frame being broken away at the front end. Fig. 2 is a plan view. Fig. 3 is an enlarged perspective view of the lower portion of the conveyer-frame and of the shovel, and Fig. 4 is a perspective view of the upper portion of said frame and the discharge-spout.

Referring to the figures by numerals of reference, 1 and 2 are side rails, which are mounted at their ends on bolsters 3 and 4, resting upon axles 5 and 6, which are supported by wheels 7 of the usual construction. A tongue 8 is connected to the front axle and has the usual draft appliances.

A bolt 9 connects the side rails 1 and 2 at a point adjacent the center thereof and extends through slots 10, which are formed between side boards 11 and rods 12, which are parallel with the front edges of the side boards and are secured to said boards adjacent their ends. By providing these slots 10 the side boards and their rods 12 can be moved longitudinally to different heights, and the bolt 9 serves as a guide therefor and holds the side boards in proper relation to the side rails at all times. Cross-rods 13 and 14 connect the rods 12 adjacent their upper and lower ends, respectively, and a chain 15 is secured to the rod 13, and another chain 16 is secured to the rod 14. Chain 15 is adapted to be placed in engagement with a hook 17, secured upon the bolster 4, and chain 16 is adapted to be fastened to a hook 18, secured to the pivot-point of the whiffletree 19 of the draft appliances. Ears 20 extend rearward from the side boards 11 at their lower ends and constitute bearings for a shaft 21, upon which is mounted a sprocket 22. Ears 23 also extend rearwardly from the upper ends of the side boards 11 and form bearings for a shaft 24, upon which is mounted a sprocket 25. An endless conveyer-chain 26 is mounted upon the two sprockets 22 and 25 and extends between the side boards 11 and over the base 27, which connects the lower or rear edges of the side boards. A shovel 28 extends from the lower ends of the side boards 11, and the bottom thereof is bent rearwardly, as shown at 29, to close the space between the ends of the side boards and in front of the conveyer-chain.

The sides of the shovel overlap the side boards and are connected thereto by a bolt 30, which also constitutes the fastening means for the lower ends of the rods 12. The shovel 28 extends forward at an angle to the side boards, so that when the machine is drawn forward the shovel will cut into the ground and remove the dirt in the path thereof. One of the ears 23 has a lateral extension 31, which is connected to a discharge-spout 32, extending laterally from the upper end of the conveyer-frame and so disposed in relation thereto that dirt after being carried to the upper end of the conveyer-frame will be moved into the spout and discharged therefrom by gravity.

A shaft 33 is journaled in suitable bearings upon the side rails 1 and 2 and in rear of the side boards 11, and mounted upon the shaft are two sprockets 34 and 35, respectively, the sprocket 34 engaging the endless conveyer-chain 26. A drive-chain 36 is mounted upon sprocket 35 and also upon a large drive-sprocket 37, which is secured to one of the rear wheels 7 and rotates therewith. Journaled upon the side rails 1 and 2 and in front of the side boards 11 is another shaft 38, having a drum 39 secured thereto and adapted to be rotated manually by means of a crank 40. A cable 41 is adapted to be wound upon the drum 39 and is connected at one end to the rod 14.

The conveyer-frame fits snugly between the side rails 1 and 2, and as these side rails are of suitable length they can be clamped upon the conveyer-frame by turning the bolt 9 and will hold said frame against movement.

When it is desired to adjust the conveyer-frame, bolt 9 is loosened and shaft 38 is rotated so as to raise or lower the conveyer-frame. By properly manipulating the chains 15 and 16 the conveyer can be swung to any desired angle and held. After the conveyer has been adjusted, it is again locked by the bolt 9 to the side rails 1 and 2. When the machine is driven forward, the shovel 28 cuts into the earth and causes the dirt to travel upward into position upon the chain 26. This chain is rotated during the forward movement of the machine, because motion is transmitted thereto by sprocket 37 through chain 36 and sprockets 35 and 34. As the dirt moves upward it is discharged upon the spout 32 and falls to one side of the machine. It will be noticed that the machine is very simple in construction and very effective. In this way ditches may be readily and easily formed.

In the foregoing description I have shown the preferred form of my invention; but I do not wish to limit myself to the precise construction shown, as I am aware that modifications can be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. The combination with the side rails of a movable frame; of a conveyer-frame adjustably mounted between the side rails, and means to clamp the side rails upon the conveyer-frame.

2. The combination with the side rails of a movable frame; of a conveyer-frame adjustably mounted between the side rails, means to clamp the side rails upon the conveyer-frame, and means for adjusting the conveyer-frame between the said rails.

3. The combination with the side rails of a movable frame; of a clamping device connecting the side rails, a conveyer-frame slidably mounted upon the clamping device and adapted to be clamped by the side rails, means for raising or lowering said frame and means connected to one end of the conveyer-frame to prevent it from swinging.

4. The combination with the side rails of a movable frame and a clamping device connecting the rails; of a conveyer-frame slidably mounted upon the clamping device and adapted to be clamped in position by the side rails, an endless conveyer-chain mounted within the conveyer-frame means operated by the movement of the movable frame for actuating the conveyer, and a shovel connected to the conveyer-frame.

5. The combination with a main frame and wheels for supporting the same and a clamping device connecting the sides of the frame; of a conveyer-frame slidably mounted upon the clamping means and adapted to be clamped in position by the side rails, a shovel projecting from the conveyer-frame, means for adjusting the conveyer-frame longitudinally, and an endless conveyer in the conveyer-frame and means operated by one of the wheels for actuating the conveyer.

6. The combination with a main frame and wheels for supporting the same; of a conveyer-frame longitudinally movable in the main frame, means for adjusting the conveyer-frame, holding devices connected to the ends of the conveyer-frame for preventing the same from swinging, a shovel extending from the conveyer-frame, an endless conveyer in the conveyer-frame, and means operated by one of the wheels for actuating the conveyer.

7. The combination with a main frame and wheels for supporting the same; of simultaneously-movable sprockets mounted upon the main frame, means for transmitting motion to the sprockets from one of the wheels, a longitudinally-movable conveyer-frame mounted within the main frame, a spout and a shovel extending from opposite ends of the conveyer-frame, an endless conveyer-chain mounted within the conveyer-frame and engaged by one of the sprockets, means for adjusting the conveyer-frame, a clamp for holding said frame against movement, and holding devices connected to the ends of the conveyer-frame to prevent swinging thereof.

In testimony whereof I have signed my name to this specification in the presence of two subscribing witnesses.

MATHIAS BROWN, JR.

Witnesses:
ALEX McHUGH,
J. F. CHRISTIANSEN, Jr.